United States Patent [19]

Grimm et al.

[11] 4,246,167

[45] Jan. 20, 1981

[54] FOUNDRY BINDER COMPOSITION

[75] Inventors: Robert A. Grimm; Heimo J. Langer; John F. Plummer, all of Columbus, Ohio

[73] Assignee: Ashland Oil, Inc., Ashland, Ky.

[21] Appl. No.: 42,464

[22] Filed: May 25, 1979

[51] Int. Cl.³ .............................................. C08K 3/00
[52] U.S. Cl. ............................. 260/42.47; 260/37 R; 260/42.53; 260/998.18
[58] Field of Search ............ 526/308; 260/42.47, 260/42.53, 37 R, DIG. 40, 998.18

[56] References Cited

U.S. PATENT DOCUMENTS

| | | | |
|---|---|---|---|
| 2,512,698 | 6/1950 | Thompson et al. | 526/308 |
| 2,587,791 | 3/1952 | Thompson et al. | 526/204 |
| 2,589,969 | 3/1952 | Schutze et al. | 565/57 |
| 2,898,325 | 8/1959 | Fusco et al. | 526/308 |
| 3,051,765 | 8/1962 | McCain | 521/25 |
| 3,192,275 | 6/1965 | Freiesleben | 260/666 |
| 3,222,315 | 12/1965 | Singer | 260/39 |
| 3,247,556 | 4/1966 | Buell et al. | 260/29.4 R |
| 3,346,534 | 10/1967 | Bills et al. | 528/254 |
| 3,390,156 | 6/1968 | Hurwitz et al. | 526/75 |

OTHER PUBLICATIONS

Kice et al., vol. 80, JACS, pp. 3796 and 3797 (1958).
Vol. 59, Chemical Abstracts, #9914 (a), 1963.
Chemische Berichte, pp. 1352 to 1356 (1957).

*Primary Examiner*—Melvyn I. Marquis
*Attorney, Agent, or Firm*—Pollock, Vande Sande & Priddy

[57] ABSTRACT

A foundry binder which contains certain fulvenes and/or prepolymers thereof, and an acid catalyst.

13 Claims, No Drawings

FOUNDRY BINDER COMPOSITION

DESCRIPTION

1. Technical Field

The present invention is directed to foundry compositions employing certain binders which are capable of being cured at normal room temperatures. The foundry compositions are capable of being cured at normal room temperatures by a gaseous curing agent or an acidic catalyst incorporated into the binder.

2. Background Art

In the foundry art, cores and molds used in making metal castings are generally prepared from shaped, cured mixtures of aggregate material (e.g. sand) and a binder. One of the preferred techniques of making these sand cores includes the basic steps of mixing the sand with a resin binder and a curing catalyst, molding the mixture to the desired shape and allowing it to cure and solidify at room temperature without the application of heat. Resins useful in this technique include the furfuryl alcohol-formaldehyde, furfuryl alcohol-urea-formaldehyde, and alkyd isocyanate resins as well as sodium silicate binders. Such technique is commonly referred to as a "no bake" process.

Another technique employed includes the basic steps of mixing the aggregate with a resin binder, molding the mixture to the desired shape, and curing the shape by passing a gaseous catalyst through it. This technique is often referred to as the "cold box" method.

Binders which are suitable for use in such processes must possess a number of important characteristics. For instance, the binders must be capable of providing relatively high strength characteristics to the molded article and must be capable of curing to considerable degree at normal room temperatures. Also, since curing of the binders occurs while as a thin layer or film on the aggregate and the aggregate can act as a heat sink, the curing does not necessarily proceed in the same manner as when the binder is cured in bulk. In addition, foundry cores and molds must retain the strength properties until the metal solidifies in the mold, but must lose such properties due to their exposure at higher temperatures so that after solidification of the metal, the cores or molds can readily be broken down for shake-out or removal for the casting. Accordingly, providing new binders for foundry applications which contains the necessary properties is quite difficult. This problem is made more acute when the object is a relatively inexpensive binder.

DESCRIPTION OF INVENTION

The present invention is directed to a foundry composition which includes a major amount of foundry aggregate, and an effective bonding amount up to about 10 percent by weight based upon the weight of the aggregate of a binder composition which comprises a fulvene and/or prepolymer thereof. The fulvenes employed are represented by the formula:

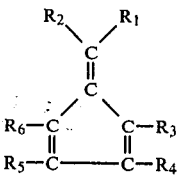

Each $R_1$ and $R_2$ individually is hydrogen or a hydrocarbon containing 1 to 10 carbon atoms or a furyl group, or are interconnected and together with the carbon atom to which they are connected form a cycloaliphatic hydrocarbon group. Each $R_3$, $R_4$, $R_5$, and $R_6$ individually is hydrogen or methyl, provided that a maximum of only one such $R_3$, $R_4$, $R_5$, and $R_6$ is methyl. The binder composition also contains an acid catalyst having a pKa of about 7 or less. The acid catalyst is incorporated into the composition prior to molding or is provided by passing a gas through the molded composition.

It should be mentioned that if excess aldehyde or ketone is used in the preparation of the fulvene $R_4$ or $R_5$ can have the structure

In such a case $R_3$ and $R_6$ will be as previously described.

BEST MODE FOR CARRYING OUT INVENTION

The fulvenes employed according to the present invention are represented by the formula:

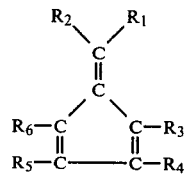

Each $R_1$ and $R_2$ individually is hydrogen or a hydrocarbon containing 1 to 10 carbon atoms or a furyl group or are interconnected and together with the carbon atom to which they are connected form a cycloaliphatic ring. The hydrocarbon groups are preferably free from nonbenzenoid unsaturation and include alkyl groups such as methyl, ethyl, propyl and butyl; aryl groups such as phenyl and naphthyl; alkaryl groups such as benzyl; aralkyl group; and cycloalkyl group such as cyclopentyl and cyclohexyl. Examples of some cycloaliphatic rings include cyclopentyl and cyclohexyl and cycloheptyl.

$R_3$, $R_4$, $R_5$, and $R_6$ each individually is hydrogen or methyl, provided that a maximum of only one $R_3$, $R_4$, $R_5$ or $R_6$ is methyl. Mixtures of the fulvenes can be used when desired. In addition, prepolymers of the above fulvenes which still contain sufficient unsaturation (e.g.—at least about 10%) for subsequent curing to provide the needed strength properties for the foundry shape, and is still fluid enough so that when applied either per se or in admixture with diluents will flow to coat the aggregate can be used in place of or in combination with the fulvenes. Mixtures of fulvene prepolymers can be used. Again it should be mentioned that if excess aldehyde or ketone is used in the preparation of the fulvene R₄ or R₅ can have the structure

In such a case R₃ and R₆ will be as previously described.

Examples of such fulvenes are dimethylfulvene (R₁ and R₂ are methyl; and R₃, R₄, R₅, and R₆ are H); methylphenylfulvene (R₁ is phenyl; R₂ is methyl; R₃, R₄, R₅, and R₆ are H); cyclohexylfulvene (R₁ and R₂ are interconnected and form a cyclohexyl ring with the common carbon atom to which they are connected; R₃, R₄, R₅, and R₆ are H); methylisobutyl fulvene (R₁ is methyl, R₂ is isobutyl; R₃, R₄, R₅, and R₆ are H); methylethyl fulvene (R₁ is methyl, R₂ is ethyl; R₃, R₄, R₅, and R₆ are H); diphenyl fulvene (R₁ and R₂ are phenyl; R₃, R₄, R₅, and R₆ are H); and furyl fulvene (R₁ is furyl, R₂ is H; and R₃, R₄, R₅, and R₆ are H).

Fulvenes have been known for many years as well as their method of preparation. Also it has been known that fulvenes polymerize in the presence of acids. The fulvenes of the present invention can be prepared by reacting a carbonyl compound (e.g.—ketones and aldehydes) with cyclopentadiene and/or methylcyclopentadiene in the presence of a basic catalyst such as a strong base (e.g. KOH), an amine, and basic ion exchange resins. Suggestions of methods for preparing fulvenes can be found in U.S. Pat. Nos. 2,589,969; 3,051,765; and 3,192,275. Suggestions of preparing fulvene polymers can be found in U.S. Pat. Nos. 2,512,698; 2,587,791; 2,898,325; and 3,390,156.

In addition, the composition of the present invention contains an acid catalyst. The acid catalysts employed have a pKa value of 7 or less and include the inorganic mineral acids, such as phosphoric acid, sulfuric acid, and hydrochloric acid and such organic acids as formic acid, oxalic acid, and the organic substituted sulfonic acids such as benzenesulfonic acid and toluenesulfonic acid. The acid catalyst can be provided in the foundry mix before molding (i.e.—"no bake" process), and/or by passing a gas through the molded composition such as an acid per se or a gas such as SO₂ or CO₂ which in conjunction with a component of the molded composition (e.g. a peroxide) forms an acid in situ.

The acid when already in the mix prior to molding is generally present in amounts up to a maximum of about 30% by weight based upon the amount of binder employed. When employing a "cold box" process usually up to about 5 seconds of gassing time is sufficient.

The fulvenes and/or polymers thereof can be employed in combination with furfuryl alcohol and/or furan prepolymer foundry binder systems. The furan prepolymer include reaction products of furfuryl alcohol and of aldehydes such as formaldehyde. In addition, the aldehyde-furfuryl alcohol reaction product can be modified with varying amounts of reactants such as urea. The mole ratios of formaldehyde to furfuryl which can be employed can vary widely. For instance, the furan polymer can be prepared from about 0.4 to about 4 moles of furfuryl alcohol per mole of formaldehyde, and preferably from about 0.5 to about 2 moles of furfuryl alcohol per mole of formaldehyde.

The furan polymer which can be employed in the present invention can be any of the various furan polymers which are known to be suitable for molding and especially foundry purposes. Examples of such furan polymers include those obtained from about 1 mole of urea, about 0.2 to 2 moles of furfuryl alcohol and about 1 to 3 moles of formaldehyde such as described in U.S. Pat. Nos. 3,222,315 and 3,247,556. Other suitable furan polymers are disclosed in U.S. Pat. No. 3,346,534. The furan polymers are usually prepared by polymerization in the presence of an acid catalyst. Usually when a furan polymer is employed, it is added together with furfuryl alcohol.

When the fulvenes are employed in admixture with furfuryl alcohol and/or furan polymers such are generally employed in amounts from 20 to 80% by weight of the mixture of the fulvenes with the furfuryl alcohol and/or furan polymers. The mixtures should have viscosities which are suitable for flow on the aggregate and should be homogeneous.

When preparing a foundry structure, the aggregate which may be employed is that commonly used in preparing foundry structures and in particular is sand. When preparing an ordinary sand-type foundry shape, the aggregate employed has a particle size large enough to provide sufficient porosity in the foundry shape to permit escape of volatiles from the shape during the casting operation. The term "ordinary sand-type foundry shapes" as used herein refers to foundry shapes which have sufficient porosity to permit escape of volatiles from it during the casting operation. Generally, at least about 80% and preferably about 90% by weight of aggregate employed for foundry shapes has an average particle size no smaller than about 150 mesh (Tyler screen mesh). The aggregate for foundry shapes preferably has an average particle size between about 50 and about 150 mesh (Tyler screen mesh). The preferred aggregate employed for ordinary foundry shapes is silica wherein at least about 70 weight percent and preferably at least about 85 weight percent of the sand is silica. Other suitable aggregate materials include zircon, aluminosilicate sand, chromite sand, and the like.

Although the aggregate employed is preferably dry, it can contain small amounts of moisture such as up to about 0.5 percent by weight or even higher based on the weight of the aggregate. In ordinary sand type foundry applications, the amount of the binder is generally no greater than about 10 percent by weight and preferably within the range of about 0.5 to about 7 percent by weight based upon the weight of the aggregate. Most often, the binder content ranges from about 1 to about 5 percent by weight based upon the weight of the aggregate in ordinary sand type foundry shapes.

When the binder systems for the present invention are used to prepare ordinary sand-type foundry shapes, the following steps are employed.

1. Forming a foundry mix containing an aggregate (e.g. sand) and the bonding agent;
2. Introducing the foundry mix into a mold or pattern to thereby form the desired shape;
3. Allowing the shape to obtain a minimum strength in the mold; and
4. Thereafter removing the shape from the mold or pattern allowing it to further cure thereby obtaining a hard solid cured foundry shape.

The foundry mix can optionally contain other ingredients such as iron oxide, ground flax fibers, wood cereals, pitch, refractory flours, and the like.

A particularly valuable additive to the polymer composition in the present invention is a silane having the general formula:

$$\begin{matrix} R'O \\ R'O \\ R'O \end{matrix} SiR$$

wherein R' is a hydrocarbon radical and preferably an alkyl radical of 1 to 6 carbon atoms and R is an alkyl radical and alkoxy substituted alkyl radical or an alkyl-amino-substituted alkyl radical in which the alkyl groups have from about 1 to 6 carbon atoms. The aforesaid silane when employed is generally in concentrations of 0.1 to about 2 percent by weight based upon the bonding agent and improves the adhesion to the foundry aggregate particle.

Examples of such suitable silanes further include gamma-aminopropyltriethoxysilane [$NH_2(CH_2)_3Si(OC_2H_5)_3$] and trimethoxysilylpropethylenediamine [$NH_2CH_2CH_2NH(CH_2)_3Si(OCH_3)_3$].

Methods of distributing the polymer on the aggregate are well known to those skilled in the art.

In order to further understand the present invention, the following non-limiting examples concerned with foundry shapes are provided. All parts are by weight unless the contrary is stated.

The following examples A–G represent some typical fulvene preparations.

EXAMPLE A

Preparation of Methyl Isobutyl Fulvene

About 2.5 moles of cyclopentadiene and about 2.5 moles of methyl isobutyl ketone are reacted in the presence of a sodium ethoxide catalyst. The reaction is conducted at temperatures of about 23°–25° C. for about 5½ hours. The yield is about 60% and the product is distilled pursuant to the method by Kice, JACS 80, 3796 (1958). The fraction boiling at 92°–94° C. has a $n_D^{25}$ of 1.5210 and according to GC analysis is 97% methyl isobutyl fulvene.

EXAMPLE B

Preparation of Methyl Ethyl Fulvene

About 3 moles of cyclopentadiene and about 3 moles of methyl ethyl ketone are reacted in the presence of an ion-exchange resin catalyst. The reaction is conducted at about 14°–41° C. for about 3 hours followed by another 16 hours at about room temperature. The yield is about 42% and the product is distilled according to the method of McCain, J. Chem. Soc., 23, 682 (1958). The fraction boiling at 67°–69° C. has a $n_D^{25}$ of 1.5330 and according to GC Analysis is 91.0% fulvene, 5.6% dicyclopentadiene, and 3.4% unknown.

EXAMPLE C

Methyl Phenyl Fulvene

To a two-liter 3-necked flask are charged isopropyl alcohol (1000 ml), methanol (300 ml) and sodium (10 g). Freshly distilled cyclopentadiene (180 g) and acetophenone (261 g) are mixed and slowly added, with stirring, to the solution in the flask. The reaction is run at room temperature. After 1½ hours, the addition is complete. The reaction mixture is mixed with water and the organic layer extracted into hexane. The hexane extract is washed with water and stripped. The crude methyl phenyl-fulvene is distilled (80°–85° C./0.1 mm) and the distillate is a ruby-red liquid.

EXAMPLE D

Pentamethylene Fulvene

To a flask containing isopropyl alcohol (500 ml) and 25% sodiummethylate solution (10 g) are added a mixture of cyclopentadiene (150 g) and cyclohexanone (200 g) over a period of two hours. When addition is complete, the mixture is mixed with water and the organic layer extracted into hexane.

EXAMPLE E

Diphenyl Fulvene

About equal molar amounts of benzophenone and cyclopentadiene are reacted in an ethanol/sodium ethoxide solution according to the method suggested by Kice, JACS 80, 3796 (1958). The dark red crystals obtained are recrystallized from ethanol and dried under vacuum.

EXAMPLE F

Furyl Fulvene

About equal molar amounts of furfural and cyclopentadiene are reacted in the presence of diethylamine catalyst and about 33% methanol solvent according to the method suggested by C. Schmidt, Chem, Ber., Volume 90, p. 1352, 1957. A viscous dark material is separated from the water layer.

EXAMPLE G

Dimethyl Fulvene

About equal molar amounts of acetone and cyclopentadiene are reacted in the presence of an amine catalyst according to the method suggested by Freiesleben, Chem. Ab. Volume 59, 9914A, 1963. The product is separated from the water layer and vacuum distilled.

EXAMPLES 1–8

Foundry sand mixes are prepared by admixing sand with the binder compositions shown in the Table below. The resulting foundry sand mixes are then formed into standard AFS tensile test samples using the standard procedures. The cured samples are tested for tensile strength and hardness. The polymer employed is a furan polymer obtained from reacting about 37.27 parts by weight of furfuryl alcohol, about 51.45 parts of weight of urea-formaldehyde concentrate of about equamolar amounts of urea and formaldehyde, about 0.20 parts by weight of $H_3PO_4$ and about 0.10 parts by weight of KOH. The acid catalyst employed is toluenesulfonic acid. The silane is gamma-amino-propyltriethoxysilane. About 3000 parts by weight of the sand are admixed with about 13.5 parts of weight of the acid catalyst and about 45 parts by weight of the furan polymer, fulvene, furfuryl alcohol, and silane package. The table gives tensile strengths in PSI and hardness values.

TABLE I

| | 1 | 2 | 3 | 4 | 5 | 6 | 7 | 8 |
|---|---|---|---|---|---|---|---|---|
| Wedron 5010 | | | | | | | | |

TABLE I-continued

|  | 1 | 2 | 3 | 4 | 5 | 6 | 7 | 8 |
|---|---|---|---|---|---|---|---|---|
| Sand | 3000g | 3000g | 3000g | 3000g | 3000g | 3000g | 3000g | 3000g |
| Acid Catalyst | 13.5g: 45g: | 13.5g: 45g: | 13.5g: 45g: | 13.5g: 45g: | 13.5g: 45g: | 13.5g: 45g: | 13.5g: 45g: | 13.5g: 45g: |
| Furan Polymer | 40% | 40% | 40% | 40% | 40% | 40% | 40% | 40% |
| Furfuryl Alcohol | 60% | 30% 30% dimethyl fulvene | 30% 30% methyl phenyl fulvene | 30% 30% cyclopenta- methylene | 40% 20% methyl heptyl fulvene | 30% 30% methyl heptyl fulvene | 40% 20% furyl fulvene | 30% 30% furyl fulvene |
| Silane | 0.15% | 0.15% | 0.15% | 0.15% | 0.15% | 0.15% | 0.15% | 0.15% |
| Work Time/ Start Time | 16'/21' | 7'/14' | 6'/13' | 6'/11' | 14'/20' | 8'/12' | 6'/12' | 5'/11' |

|  | ten-sile | hard-ness | ten-sile | hard-ness | ten-sile | hard-ness | ten-sile | hard-ness | ten-sile | hard-ness | ten-sile | hard-ness | ten-sile | hard-ness | ten-sile | hard-ness |
|---|---|---|---|---|---|---|---|---|---|---|---|---|---|---|---|---|
| 2 hr. | 505 | 80 | 85 | 45 | 235 | 75 | 145 | 59 | 213 | 82 | 102 | 76 | 77 | 64 | 118 | 69 |
| 4 hr. | 530 | 73 | 130 | 51 | 320 | 75 | 137 | 54 | 287 | 83 | 118 | 73 | 133 | 73 | 160 | 74 |
| 24 hr. | 625 | 79 | 135 | 54 | 372 | 74 | 157 | 55 | 300 | 86 | 120 | 76 | 135 | 74 | 142 | 68 |
| 24 hr. + 1 hr. at 100% relative humidity | 488 | 77 | 88 | 54 | 357 | 74 | 207 | 64 | 252 | 86 | 92 | 75 | 113 | 60 | 158 | 60 |

Although the tensile strengths of the binders with the fulvenes replacing varying amounts of the furfuryl alcohol are lower than that without the fulvenes, the use of the fulvenes provide satisfactory results for a foundry binder and is much less expensive than the use of the larger amounts of furfuryl alcohol.

EXAMPLES 9 and 10

Foundry sand mixes are prepared by admixing Wedron 5010 sand (2000 grams) with 24 grams of a binder composition containing 40% by weight of the furan polymer of the type employed in Examples 1-8; about 0.15% of the silane employed in examples 1-8; and varying amounts of furfuryl alcohol (FA) and fulvene shown in the Table below; and with 16 grams of methylethyl ketone peroxide. The resulting sand mixes are then formed into standard AFS tensile test samples using the standard procedure. The samples are cured by gassing with SO₂ for 5 seconds unless stated otherwise and then purged with air for 10 seconds unless stated otherwise. The cured samples are tested for tensile strength.

TABLE II

| % FA | TENSILE STRENGTH, PSI | | |
|---|---|---|---|
| % Fulvene | IMM | 1 HR. | 24 HR. |
| 60% FA 40% FA | 115 | 187.5 | 200 |
| 20% dimethyl fulvene | 110 | 224 | 278 |

We claim:
1. A foundry composition comprising:
    a. a major amount of foundry aggregate; and
    b. an effective bonding amount up to about 10 percent by weight based upon the weight of the aggregate of a binder composition which comprises a fulvene of the formula:

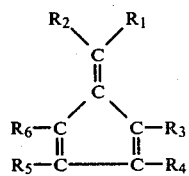

wherein each $R_1$ and $R_2$ individually is hydrogen or a hydrocarbon containing 1 to 10 carbon atoms or a furyl group; or are interconnected and together with the carbon atom to which they are connected form a cycloaliphatic hydrocarbon group; and wherein each $R_3$, $R_4$, $R_5$, and $R_6$ individually is hydrogen or methyl, provided that a maximum of only one such $R_3$, $R_4$, $R_5$ and $R_6$ is methyl; prepolymers of said fulvenes; and mixtures thereof; and and acid catalyst having a pKa of about 7 or less.

2. The composition of claim 1 wherein said acid is formed in situ.

3. The composition of claim 1 wherein said binder also contains furfuryl alcohol.

4. The composition of claim 1 wherein said binder also contains furfuryl alcohol and a furan polymer.

5. The composition of claim 1 which further contains a silane.

6. The composition of claim 1 wherein said fulvene is dimethylfulvene.

7. The composition of claim 1 wherein said fulvene is methylphenylfulvene.

8. The composition of claim 1 wherein said fulvene is methyl isobutyl fulvene.

9. The composition of claim 1 wherein said fulvene is cyclopentamethylene fulvene.

10. The composition of claim 1 wherein said fulvene is methyl heptyl fulvene.

11. The composition of claim 1 wherein said fulvene is furyl fulvene.

12. The composition of claim 1 wherein said fulvene is methyl ethyl fulvene.

13. A foundry composition comprising:
    a. a major amount of foundry aggregate; and
    b. an effective bonding amount up to about 10 percent by weight based upon the weight of the aggregate of a binder composition which comprises a fulvene prepared as a reaction product of a carbonyl compound and a cyclopentadiene of the formula:

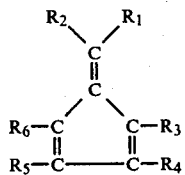

wherein each $R_1$ and $R_2$ individually is a hydrocarbon containing 1 to 10 carbon atoms or a furyl group; or are interconnected and together with the carbon atome to which they are connected form a cycloaliphatic hydrocarbon group; and wherein each $R_3$, $R_4$, $R_5$, and $R_6$ individually is hydrogen or methyl, provided that a maximum of only one such $R_3$, $R_4$, $R_5$ and $R_6$ is methyl; further provided that if the mole ratio of carbonyl to cyclopentadiene is greater than one $R_4$ or $R_5$ can have the structure

prepolymers of said fulvenes; and mixtures thereof; and acid catalyst having a pKa of about 7 or less.

* * * * *